United States Patent
Godwin

(10) Patent No.: US 9,325,492 B2
(45) Date of Patent: Apr. 26, 2016

(54) METHOD FOR INCREASING I/O PERFORMANCE IN SYSTEMS HAVING AN ENCRYPTION CO-PROCESSOR

(75) Inventor: Kurt Godwin, Loveland, CO (US)

(73) Assignee: STMICROELECTRONICS, INC., Coppell, TX (US)

( * ) Notice: Subject to any disclaimer, the term of this patent is extended or adjusted under 35 U.S.C. 154(b) by 894 days.

(21) Appl. No.: 12/660,952

(22) Filed: Mar. 8, 2010

(65) Prior Publication Data

US 2011/0138194 A1 Jun. 9, 2011

Related U.S. Application Data

(60) Provisional application No. 61/266,829, filed on Dec. 4, 2009.

(51) Int. Cl.
*H04K 1/04* (2006.01)
*H04L 9/00* (2006.01)

(52) U.S. Cl.
CPC ........................................ *H04L 9/00* (2013.01)

(58) Field of Classification Search
CPC ..... H04L 9/06; H04L 9/0687; G06F 12/1408; G06F 21/72
USPC ......... 380/36–38, 29, 277; 713/189, 193, 190
See application file for complete search history.

(56) References Cited

U.S. PATENT DOCUMENTS

| | | | | |
|---|---|---|---|---|
| 7,454,017 B2* | 11/2008 | Kaminaga et al. | | 380/46 |
| 7,796,517 B2* | 9/2010 | Chen et al. | | 370/235 |
| 7,900,057 B2* | 3/2011 | Chiu et al. | | 713/189 |
| 7,937,595 B1* | 5/2011 | Kumar et al. | | 713/192 |
| 2006/0174013 A1* | 8/2006 | Katsumata et al. | | 709/227 |
| 2007/0260756 A1* | 11/2007 | Tseng et al. | | 710/5 |
| 2010/0058049 A1* | 3/2010 | Fein et al. | | 713/150 |
| 2010/0058052 A1* | 3/2010 | Bartels et al. | | 713/153 |
| 2010/0153747 A1* | 6/2010 | Asnaashari et al. | | 713/193 |

\* cited by examiner

*Primary Examiner* — Jeffery Williams
*Assistant Examiner* — Suman Debnath
(74) *Attorney, Agent, or Firm* — Allen, Dyer, Doppelt, Milbrath & Gilchrist, P.A.

(57) ABSTRACT

A system and method for improving performance while transferring encrypted data in an input/output (I/O) operation are provided. The method includes receiving a block of data. The method also includes dividing the block of data into a plurality of sub-blocks of data. The method further includes performing a first operation on a first sub-block. The method also includes performing a second operation on a second sub-block at substantially the same time as performing the first operation on the first sub-block. The method still further includes reassembling the plurality of sub-blocks into the block of data.

20 Claims, 4 Drawing Sheets

US 9,325,492 B2

METHOD FOR INCREASING I/O PERFORMANCE IN SYSTEMS HAVING AN ENCRYPTION CO-PROCESSOR

CROSS-REFERENCE TO RELATED APPLICATION(S) AND CLAIM OF PRIORITY

The present application is related to U.S. Provisional Patent Application No. 61/266,829, filed Dec. 4, 2009, entitled "METHODS FOR INCREASING I/O PERFORMANCE IN SYSTEMS HAVING AN ENCRYPTION CO-PROCESSOR". Provisional Patent Application No. 61/266,829 is assigned to the assignee of the present application and is hereby incorporated by reference into the present application as if fully set forth herein. The present application hereby claims priority under 35 U.S.C. §119(e) to U.S. Provisional Patent Application No. 61/266,829.

TECHNICAL FIELD

The present disclosure is directed, in general, to data input/output (I/O) operations, and more specifically, to methods for improving I/O performance in systems having one or more encryption co-processors.

BACKGROUND

When adding encryption/decryption to a computing system that includes a data storage component, such as a hard disk drive (HDD), input/output (I/O) performance to the HDD can suffer due to the added step of encrypting/decrypting the data. For example, if cryptographic algorithms are applied in series with large transfers to or from the HDD, this can be detrimental to the overall system performance.

There is, therefore, a need in the art for I/O methods that improve system performance between computing systems with encryption co-processors and their associated data storage components.

SUMMARY

A method for transferring encrypted data in an input/output (I/O) operation is provided. The method includes receiving a block of data. The method also includes dividing the block of data into a plurality of sub-blocks of data. The method further includes performing a first operation on a first sub-block. The method also includes performing a second operation on a second sub-block at substantially the same time as performing the first operation on the first sub-block. The method still further includes reassembling the plurality of sub-blocks into the block of data.

A system for transferring encrypted data in an I/O operation is provided. The system includes a data splitting engine configured to receive a block of data, divide the block of data into a plurality of sub-blocks of data, and reassemble the plurality of sub-blocks into the block of data. The system also includes a processor configured to perform a first operation on a first sub-block. The system further includes an encryption processor in communication with the processor, the encryption processor configured to perform a second operation on a second sub-block at substantially the same time as the processor performs the first operation on the first sub-block.

A computer program product for transferring encrypted data in an input/output (I/O) operation is provided. The computer program product includes a tangible machine-readable medium encoded with computer-executable instructions that when executed cause a data processing system to perform the steps of the method described above.

Other technical features may be readily apparent to one skilled in the art from the following figures, descriptions and claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged transmission medium.

To improve I/O performance by minimizing the detrimental effects of transferring a large block of encrypted data in series, a single I/O operation may be broken up into smaller data units. The cryptographic operation can then be applied to the smaller units in parallel with the subsequent disk transfers, thereby creating interleaved subordinate operations. A data splitting engine is disclosed herein that is responsible for splitting and reassembling the encrypted units, as described below.

Figure 1:
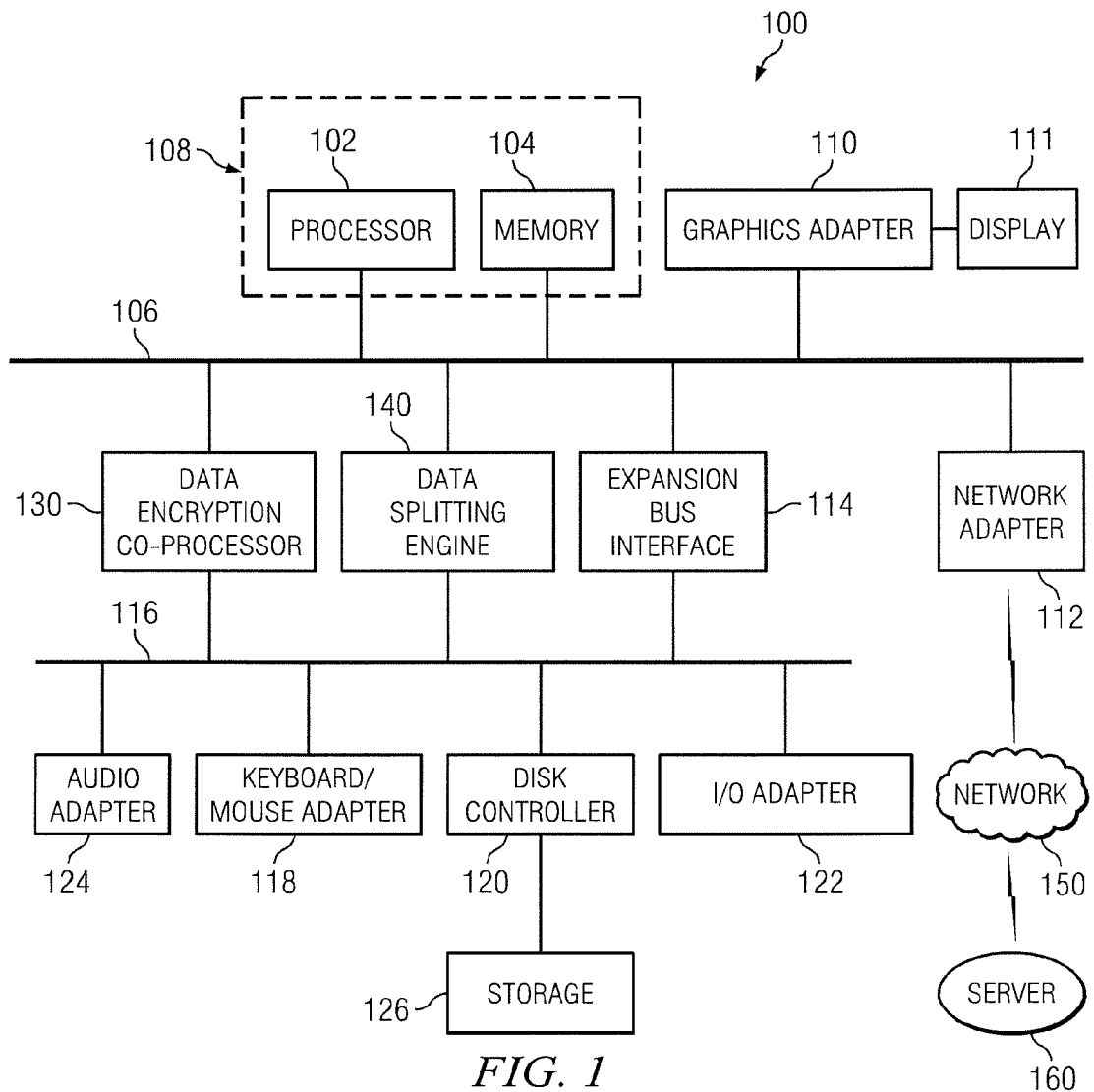
FIG. 1 depicts a block diagram of a data processing system capable of implementing a system in accordance with embodiments of the present disclosure.

FIG. 1 depicts a block diagram of a data processing system capable of implementing a system in accordance with embodiments of the present disclosure. Data processing system 100 includes a processor 102 (e.g., a central processing unit, or "CPU") connected to a local system bus 106. Local system bus 106 may be, for example, a peripheral component interconnect (PCI) architecture bus. Also connected to local system bus 106 in the depicted example are a main memory 104 and a graphics adapter 110. The graphics adapter 110 may be connected to display 111. Collectively, processor 102 and memory 104 may represent all or part of an operating system 108.

Other peripherals, such as network adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as flash drives, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, track pointer, etc.

Network adapter 112 can be connected to a network 150, which can be any public or private data processing system network or combination of networks, as known to those of skill in the art, including the Internet. Data processing system 100 can communicate over network 150 with server system 160, which can be implemented as a separate data processing system.

In accordance with embodiments of the present disclosure, data processing system also includes data encryption co-processor 130 and data splitting engine 140. Data encryption co-processor 130 and data splitting engine 140 are in communication with other parts of system 100, including processor 102, disk controller 120, and storage 126.

Those of ordinary skill in the art will appreciate that the components depicted in FIG. 1 may vary for particular embodiments. For example, processor 102 may actually represent a multi-processor or a distributed processing system. Likewise, operating system 108 may include additional or other components, including those already depicted in FIG. 1. Other peripheral devices, such as an optical disk drive and the like, also may be used in addition or in place of the components depicted. Furthermore, although data encryption co-processor 130 and data splitting engine 140 are shown as separate components, they may be implemented together as one component, or as part of one or more other components, such as processor 102. The depicted example is provided for the purpose of explanation only and is not meant to imply architectural limitations with respect to the present disclosure.

Figure 2:
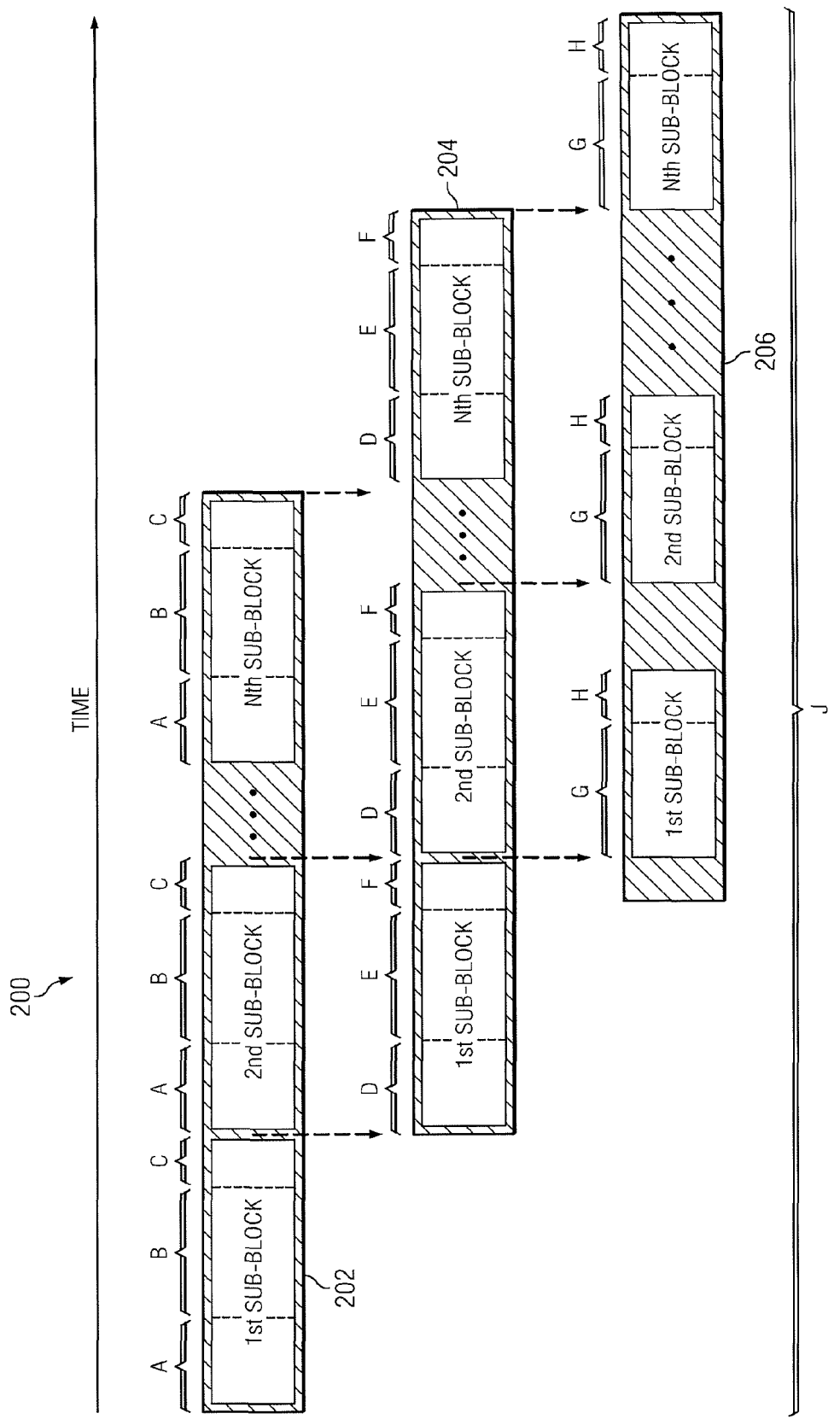
FIG. 2 depicts a single interleaved I/O operation for a block of data between an operating system and an associated data storage device, according to embodiments of the present disclosure.

FIG. 2 depicts a single interleaved I/O operation for a block of data between an operating system and an associated data storage device, according to embodiments of the present disclosure. For ease of explanation, I/O operation 200 shown in FIG. 2 is described with respect to the data processing system 100 of FIG. 1. However, it will be understood that I/O operation 200 may be implemented with any other suitable system or device. Although the embodiment depicted in FIG. 2 describes communication with a data storage device (e.g., storage 126), it is understood that encryption co-processors may be used in communication other than to a data storage device. For example, embodiments of the present disclosure may be used in communication across networks (e.g., network 150) or other communication mechanisms.

In the embodiment depicted in FIG. 2, I/O operation 200 is a read operation of a block of data from storage 126 to operating system 108. A write operation according to the present disclosure would include the same or similar components; however, the operation would be performed in the opposite direction. In the example embodiment, storage 126 is a HDD having a serial advanced technology attachment (SATA) adapter. In one advantageous embodiment, the block of data that is read from HDD 126 to operating system 108 is 128 kilobytes (128 KB) of data. However, it is understood that other block sizes are possible.

Data splitting engine 140 divides a block of data to be transferred in I/O operation 200 into N sub-blocks of data. I/O operation 200 is also divided into subordinate I/O operations, or steps, where the steps are generally indicated in FIG. 2 by the letters A through H. Steps A, B, and C of I/O operation 200 correspond to the operation up to the point where the frame information structure (FIS) is received at HDD 126. Steps A, B, and C are repeated for each of the N sub-blocks of data, as indicated by reference numeral 202.

Step A represents the time it takes for data splitting engine 140 to split each sub-block of data in I/O operation 200 from the larger data block. This is a CPU-intensive operation. In one embodiment, data splitting engine 140 parses out each sub-block of data from the data block at the time that the sub-block is ready to be processed. In another embodiment, the entire data block is first divided into N data sub-blocks, and the N sub-blocks are then stored until they are ready to be processed.

Step B represents the time for the I/O operation to be sent to HDD 126. This includes the scatter/gather time and FIS construction time. Step C is the time required for the SATA bus to receive the FIS. In a typical HDD, this value is a constant.

Steps D, E, and F of I/O operation 200 correspond to the direct memory access (DMA) of the data from the HDD to host memory. Steps D, E, and F are also repeated for each of the N sub-blocks of data, as indicated by reference numeral 204. Step D corresponds to the drive delay (e.g., the seek time). Step E represents the DMA of data from HDD 126 to host memory. Step F includes the time to complete the following components: the notification to data splitting engine 140 that the split is complete, the overhead of data splitting engine 140 to queue the data block to encryption co-processor 130, and the encryption co-processor program time.

Finally, steps G and H of I/O operation 200 correspond to the DMA of data from host memory, then back to host memory. Steps G and H are also repeated for each of the N sub-blocks of data, as indicated by reference numeral 206. Specifically, step G corresponds to the encryption co-processor DMA from host memory and back to host memory. Essentially, G represents a performance capability of encryption co-processor 130. This is described below in greater detail.

Step H represents the encryption co-processor interrupt processing time and the processing time for data splitting engine 140 to coalesce the N sub-blocks of data back to one complete data block (e.g., the original 128 KB data block). In one embodiment, each sub-block may be added to the data block as the I/O operation for that sub-block completes. In another embodiment, all of the sub-blocks may be reassembled at the same time, once the I/O operation for the final sub-block completes. This is analogous to the described alternative methods of splitting the data block in step A.

As shown in FIG. 2, steps A through H are interleaved so that different sub-blocks of data are processed in parallel (i.e., at the same time or substantially the same time) in different I/O operations. For example, FIG. 2 shows that while the request for the second sub-block of data is being sent to HDD 126 (step B in operation 202), the first sub-block of data is being transferred from HDD 126 to host memory (step E in operation 204). As another example, while the Nth (e.g., third) sub-block of data is being split out from the larger data block (step A in operation 202), the second sub-block is transferred from HDD 126 to host memory (step E in operation 204), and the first sub-block is being reassembled into the final data block (step H in operation 206).

Although FIG. 2 depicts one example embodiment of an interleaved I/O operation, it will be understood that various modifications to the embodiment of FIG. 2 are possible. For example, the amount of time required by each step A through H may vary from those depicted in FIG. 2. As another example, the steps performed in each parallel operation 202-206 may also vary between embodiments. Similarly, although FIG. 2 depicts three parallel operations 202-206, more or fewer parallel operations are possible.

Figure 3:
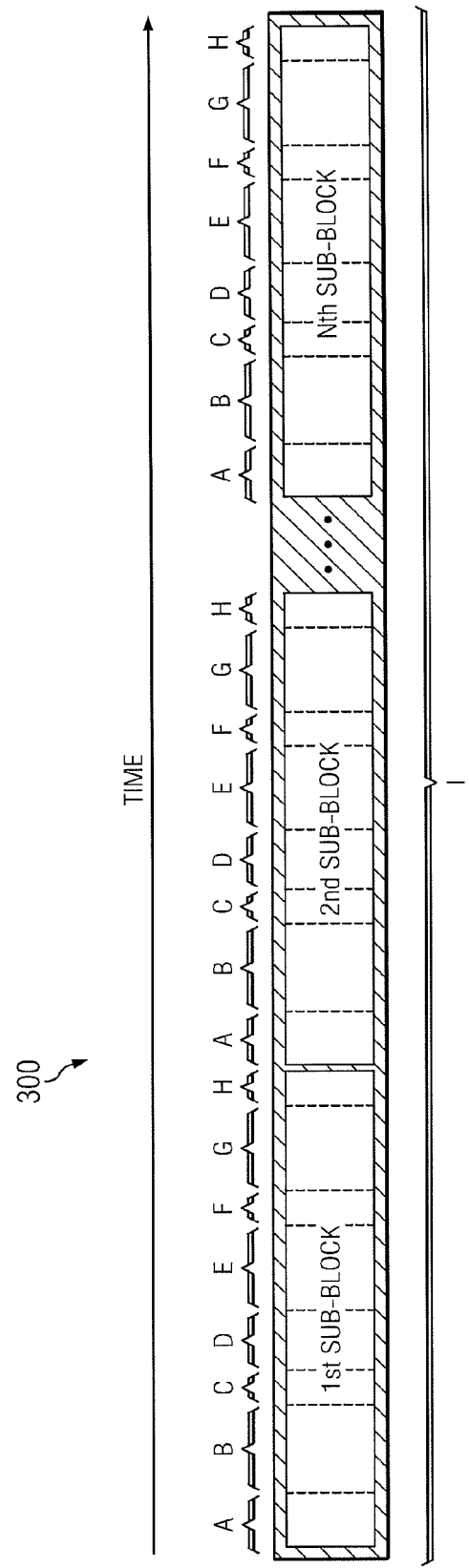
FIG. 3 depicts a single sequential I/O operation for a block of data between an operating system and an associated data storage device, according to embodiments of the present disclosure.

In contrast to interleaved I/O operation 200, FIG. 3 depicts a single sequential I/O operation for a block of data between an operating system and an associated data storage device, according to embodiments of the present disclosure. For ease of explanation, I/O operation 300 shown in FIG. 3 is described with respect to the data processing system 100 of FIG. 1. However, it will be understood that I/O operation 300 may be implemented with any other suitable system or device.

Like interleaved I/O operation 200, sequential I/O operation 300 is a read operation of a block of data from storage 126 to operating system 108. A write operation according to the present disclosure would include the same or similar components; however, the operation would be performed in the opposite direction. In the example embodiment, storage 126 is a HDD having a serial advanced technology attachment (SATA) adapter. In one advantageous embodiment, the block of data that is read from HDD 126 to operating system 108 is 128 kilobytes (128 KB) of data. However, it is understood that other block sizes are possible.

As in interleaved I/O operation 200 in FIG. 2, the block of data to be transferred in sequential I/O operation 300 is divided into N sub-blocks of data. I/O operation 300 is also divided into steps A through H. Steps A through H are repeated for each of the N sub-blocks of data, as indicated in FIG. 3. However, unlike the interleaved subordinate operations described in FIG. 2, the steps in I/O operation 300 are sequential. Each sub-block of data is processed completely (i.e., steps A through H are performed on each sub-block) before the next sub-block of data is processed. Only one process or operation occurs at a time.

Time I represents the total time of sequential I/O operation 300, where the sum of D, E, and G are assumed to be constant for any value N. Other values increase with the value of N. The total time I is determined according to the formula below:

$$I = \sum_{i=1}^{n} (A_i + B_i + C_i + D_i + E_i + F_i + G_i + H_i)$$

In this formula, the values A, B, C, D, E, F, G, and H correspond to the times elapsed in the steps described above. Because each step in I/O operation 300 is performed in sequence, time I reflects no advantage or performance improvement from interleaving. In contrast, the interleaving of subordinate I/O operations in I/O operation 200 provides a performance improvement over sequential I/O operation 300. The performance improvement in I/O operation 200 due to the data splitting engine and interleaving can be defined and measured. Referring back to FIG. 2, time J represents the total time of interleaved I/O operation 200. Total time J is determined according to the formula below:

$$J(n) = A_1 f + \left( \sum_{i=2}^{n} (A_i f + B_i f + C_i) \right) + F_n f + \left( \frac{G}{n} \right) + H_n f$$

In this formula, n is equal to N, the number of data sub-blocks split from the larger data block. The following variable is also defined:

f=CPU Factor

The variable f represents the performance capabilities of the CPU. This is analogous to the variable G, which represents a performance capability of the encryption co-processor. Low values for f and G correspond to a high-performance (i.e., fast) operation. The variable f is included in the formula because the CPU speed necessarily has an impact on the time it takes to complete an I/O operation. In a theoretical system where f equals zero (i.e., an infinitely fast CPU), the formula for the total time J is simplified to the following formula:

$$J(n)_{f=0} = \left( \sum_{i=2}^{n} (C_i) \right) \left( \frac{G}{n} \right)$$

A combined performance impact K can also be defined. The combined performance impact takes into account the performance capability of the HDD (defined by variable L) and the performance capability of the encryption co-processor (defined by variable G). Depending on whether or not the HDD has a higher performance capability than the encryption co-processor (i.e., whether L<G or L>=G), the combined transfer rate K is defined by one of the two formulas below:

$$K_{L<G} = L + J(n)$$

$$K_{L>=G} = \frac{L}{n} + \left( G - \frac{G}{n} \right) + J(n)$$

Figure 4:
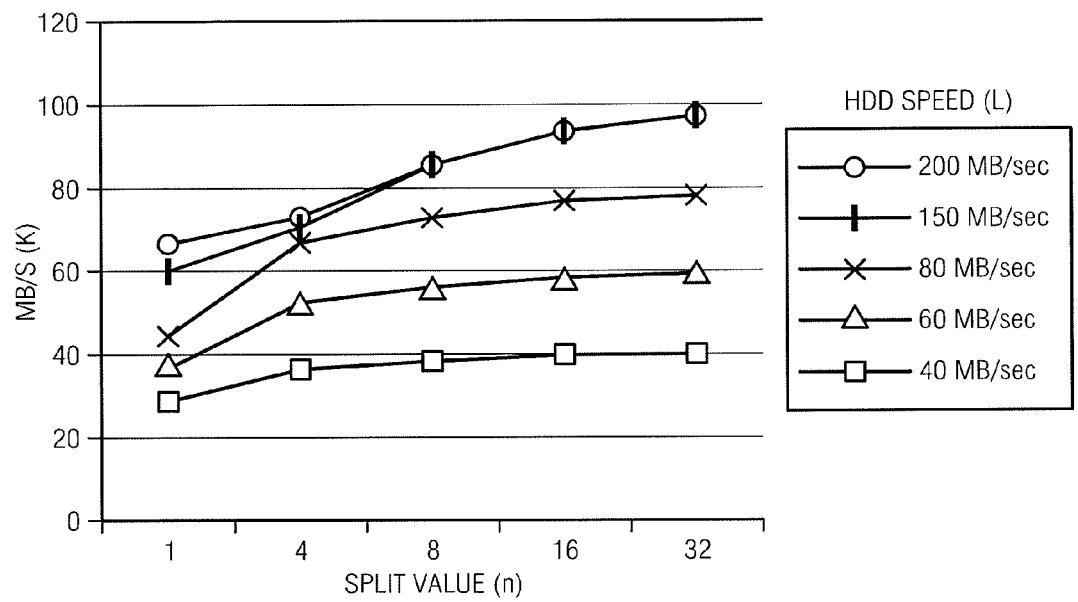
FIG. 4 depicts a graph showing a combined performance impact for various split values, according to one embodiment of the present disclosure.

FIG. 4 depicts a graph showing combined performance impact K for various values of N, the number of sub-blocks of data, according to one embodiment of the present disclosure. In the embodiment depicted in the graph, the CPU factor f equals zero (i.e., a theoretical CPU having infinite speed), and the encryption co-processor performance value G equals 100 megabytes/second (100 MB/sec). Value C (the time required for the SATA bus to receive the FIS) is assumed to be approximately zero, the theoretical minimum. The graph depicts performance for a number of different HDD speeds, from 40 megabytes/second to 200 megabytes/second (40 MB/sec-200 MB/sec). For each speed, as the number of sub-blocks of data is increased, the combined performance K improves.

Figure 5:
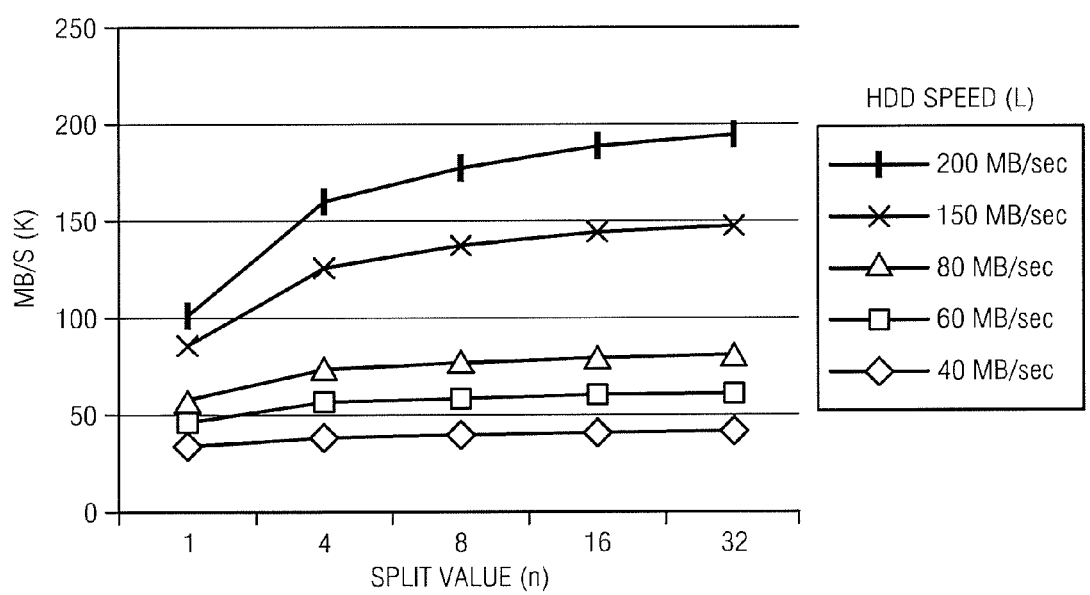
FIG. 5 depicts a graph showing a combined performance impact for various split values, according to another embodiment of the present disclosure.

FIG. 5 depicts a graph showing combined performance impact K for various values of N, the number of sub-blocks of data, according to another embodiment of the present disclosure. In this embodiment, the CPU factor f also equals zero, but the encryption co-processor performance value G now equals 200 megabytes/second (200 MB/sec). Value C is once again assumed to be approximately zero, the theoretical minimum. The graph in FIG. 4 also depicts performance for a number of different HDD speeds, from 40 megabytes/second to 200 megabytes/second (40 MB/sec-200 MB/sec). For each speed, as the number of sub-blocks of data is increased, the HDD performance improves.

As the graphs in FIGS. 4 and 5 show, it is possible to obtain different levels of performance improvement by selecting different values for N. Because the optimal value of N may not be empirically available for every HDD, data block size, and/or other environmental parameter, it may be necessary or desirable to dynamically tune the value of N, thereby adjusting the size of the data sub-blocks. In one embodiment, a first value of N is chosen, then one or more data blocks are transferred in an I/O operation such as interleaved I/O operation 200. Once the I/O operation of the one or more data blocks is complete, performance metrics of the I/O operation are obtained and examined. If the performance metrics are close enough to a desired value, the current value of N may be identified as the optimal value for that particular I/O environment. Alternatively, if the performance metrics are not close enough to the desired value, the value of N may be adjusted higher or lower. The I/O operation is then performed again using the new value of N.

Note that various details have been provided above describing specific implementations of a system that interleaves an I/O operation for a block of encrypted data. These details are provided for illustration and explanation of the specific implementations. Various modifications to the specific implementations may be made according to particular needs.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for transferring encrypted data in an input/output (I/O) operation, the method comprising:
   receiving a block of data to be transferred between a local data storage device and a local host memory;
   dividing the block of data within a data splitting engine into an "N" number of interleaved sub-blocks of data based on performance capabilities of the encryption processor and its interrupt processing time;
   performing a data transfer operation sequentially on the "N" sub-blocks of data, the data transfer operation comprising operations preceding and including a frame information structure (FIS) being received at the local data storage device;
   performing a data encryption or decryption operation at an encryption processor on the "N" sub-blocks of data, at least a portion of the data transfer operation on a sub-block of data being performed concurrently with at least a portion of the data encryption or decryption operation performed on a next sequential sub-block of data within the encryption processor;
   changing the value of "N" based on performance metrics of the sub-blocks of data;
   reassembling the "N" number of interleaved sub-blocks of data into the block of data; and
   storing the reassembled block of data at the local host memory.

2. The method of claim 1, wherein the data transfer operation further comprises a scatter/gather operation and a FIS construction operation associated with the local data storage device.

3. The method of claim 2, wherein the data encryption or decryption operation comprises queuing the next sequential sub-block of data to the encryption processor.

4. The method of claim 3, wherein the local data storage device comprises a hard disk drive coupled to the host memory.

5. The method of claim 1, wherein the data is transferred to or from a network device.

6. The method of claim 1, wherein the "N" number of interleaved sub-blocks of data is dynamically adjusted.

7. The method of claim 1, wherein the encryption processor comprises an encryption co-processor.

8. A system for transferring encrypted data in an input/output (I/O) operation, the system comprising:
   a data splitting engine configured to:
      receive a block of data to be transferred between a local data storage device and a local host memory,
      divide the block of data into an "N" number of interleaved sub-blocks of data, and
      reassemble the "N" number of interleaved sub-blocks of data into the block of data;
   a processor configured to perform a data transfer operation sequentially on the "N" sub-blocks of data, the data transfer operation comprising operations preceding and including a frame information structure (FIS) being received at the local storage device;
   an encryption processor in communication with the processor, the encryption processor configured to perform a data encryption or decryption operation on the "N" sub-blocks of data, wherein at least a portion of the data encryption or decryption operation on a sub-block of data is performed concurrently with at least a portion of the data transfer operation performed on a next sequential sub-block of data in the sequence;
   wherein the data splitting engine is configured to change the value of "N" based on performance metrics of the sub-blocks of data and divide the block of data into the "N" number of interleaved sub-blocks of data based on performance capabilities of the encryption processor and its interrupt processing time; and
   a local host memory that stores the reassembled block of data.

9. The system of claim 8, wherein the data transfer operation further comprises a scatter/gather operation and a FIS construction operation associated with the local data storage device.

10. The system of claim 9, wherein the data encryption or decryption operation comprises queuing the next sequential sub-block of data to the encryption processor.

11. The system of claim 10, wherein the local data storage device comprises a hard disk drive coupled to the host memory.

12. The system of claim 8, wherein the data is transferred to or from a network device.

13. The system of claim 8, wherein the "N" number of interleaved sub-blocks of data is dynamically adjusted.

14. The system of claim 8, wherein the encryption processor is an encryption co-processor.

15. A computer program product for transferring encrypted data in an input/output (I/O) operation, the computer program product comprising a non-transitory machine-readable medium encoded with computer-executable instructions that when executed cause a data processing system to perform:
   receiving a block of data to be transferred between a local data storage device and a local host memory;
   dividing the block of data into an "N" number of interleaved sub-blocks of data at a data splitting engine based on performance capabilities of the encryption processor and its interrupt processing time;
   performing a data transfer operation sequentially on the "N" sub-blocks of data, the data transfer operation comprising operations preceding and including a frame information structure (FIS) being received at the local data storage device;
   performing a data encryption or decryption operation at an encryption processor on the "N" sub-blocks of data, at least a portion of the data encryption or decryption operation on a sub-block of data being performed concurrently with at least a portion of the data transfer operation performed on a next sequential sub-block of data in the sequence;
   changing the value of "N" based on performance metrics of the sub-blocks of data,
   reassembling the "N" number of interleaved sub-blocks of data into the block of data; and
   storing the reassembled block of data at the local host memory.

16. The computer program product of claim 15, wherein the data transfer operation further comprises a scatter/gather operation and a FIS construction operation associated with the local data storage device.

17. The computer program product of claim 16, wherein the data encryption or decryption operation comprises queuing the next sequential sub-block of data to the encryption processor.

18. The computer program product of claim 17, wherein the local data storage device comprises a hard disk drive coupled to the host memory.

19. The computer program product of claim 15, wherein the data is transferred to or from a network device.

20. The computer program product of claim 15, wherein the "IN" number of interleaved sub-blocks of data is dynamically adjusted.

* * * * *

UNITED STATES PATENT AND TRADEMARK OFFICE
CERTIFICATE OF CORRECTION

PATENT NO. : 9,325,492 B2  
APPLICATION NO. : 12/660952  
DATED : April 26, 2016  
INVENTOR(S) : Kurt Godwin Page 1 of 1

It is certified that error appears in the above-identified patent and that said Letters Patent is hereby corrected as shown below:

In the Claims

| Column 10, Line 29, | Delete: ""IN"" |
| Claim 20 | Insert --"N"-- |

Signed and Sealed this  
Twenty-first Day of June, 2016

Michelle K. Lee  
*Director of the United States Patent and Trademark Office*